United States Patent [19]
Fujimoto et al.

[11] Patent Number: 5,355,001
[45] Date of Patent: Oct. 11, 1994

[54] METHOD FOR RECORDING DATA, AND PRINTED BODY PRINTED BY THE METHOD, AND DATA RECORDING MEDIUM, AND METHOD FOR READING DATA FROM DATA RECORDING THE MEDIUM

[75] Inventors: Takeo Fujimoto; Yoshiyuki Itoh, both of Tokyo; Makoto Tomioka, Chiba, all of Japan

[73] Assignee: Toppan Printing Co., Ltd., Tokyo, Japan

[21] Appl. No.: 915,830

[22] PCT Filed: Nov. 27, 1991

[86] PCT No.: PCT/JP91/01632
§ 371 Date: Jul. 28, 1992
§ 102(e) Date: Jul. 28, 1992

[87] PCT Pub. No.: WO92/09972
PCT Pub. Date: Jun. 11, 1992

[30] Foreign Application Priority Data

Nov. 28, 1990 [JP] Japan ................... 2-331372
Aug. 22, 1991 [JP] Japan ................... 3-210578

[51] Int. Cl.$^5$ ............................................. G06K 19/06
[52] U.S. Cl. ................................. 235/494; 235/454; 235/469; 235/470
[58] Field of Search ................. 235/494, 454, 469, 470

[56] References Cited

U.S. PATENT DOCUMENTS

| 3,176,141 | 3/1965 | Siegemund | 235/469 |
| 3,835,297 | 9/1974 | Inoue | 235/469 |
| 4,023,040 | 5/1977 | Weber | 235/469 |
| 4,488,679 | 12/1984 | Bockholt et al. | 235/469 |
| 4,692,603 | 9/1987 | Brass | 235/494 |
| 4,711,995 | 12/1987 | Genest | 235/454 |
| 5,003,600 | 3/1991 | Deason | 235/470 |
| 5,023,434 | 6/1991 | Lanfer | 235/469 |

FOREIGN PATENT DOCUMENTS

| 51-134032 | 11/1976 | Japan . |
| 52-41512 | 3/1977 | Japan . |
| 58-25997 | 2/1983 | Japan . |
| 63-254586 | 10/1988 | Japan . |
| 63-293081 | 11/1988 | Japan . |
| 2-50280 | 2/1990 | Japan . |
| 2-117885 | 5/1990 | Japan . |

Primary Examiner—Harold Pitts
Attorney, Agent, or Firm—Burns, Doane, Swecker & Mathis

[57] ABSTRACT

A method of recording a large quantity of data by one code mark. Four bit indicating fields (2a, 2b, 2c, 2d) for denoting a binary number of four bits are provided on the surface of a card (1). One numerical value is recorded by indicating predetermined bit parts of the four bit indicating fields (2a–2d) with the same color, and plural kinds of colors are mixedly given to the four bit indicating fields (2a–2d).

9 Claims, 6 Drawing Sheets

METHOD FOR RECORDING DATA, AND PRINTED BODY PRINTED BY THE METHOD, AND DATA RECORDING MEDIUM, AND METHOD FOR READING DATA FROM DATA RECORDING THE MEDIUM

BACKGROUND OF THE INVENTION

1. Field of the Invention

This invention relates to a method for recording binary data on a piece of material such as a card and to a printed body where data are recorded by the method.

2. Description of the Prior Art

Heretofore, a bar code system is employed for displaying binary data on a piece of material.

In this system, data are recorded by arranging a group of variously patterned black bars and spaces. The recorded data are read out in such a manner that a light beam emitted from a reading device is scanned in the direction of a series of adjacent stripes, light reflected on a piece of material where the bars are printed is successively detected, and it is transferred into electric signals.

Nowadays, a great deal of data have come to be recorded in such a bar code. This, however, caused a problem that the reading device might read out data by mistake because of a long series of bars. Further, there is a problem that it is difficult to accurately arrange spaces between black bars composing a bar code.

To record such data more simply, another method for recording data is proposed wherein there are formed a first bit indicating field for displaying the first bit of a binary number, a second bit indicating field for displaying the second bit thereof, a third bit indicating field for displaying the third bit thereof, and a fourth bit indicating field for displaying the fourth bit thereof, the first through fourth bit indicating fields are individually marked to produce a code mark as a unit displaying binary data, and the code mark is printed on a piece of material (see Japanese Patent Application Early Laid-open Publication No. Sho 63-132093).

According to the previously proposed method, the cardinal number 1001 in the binary system (equivalent to 9 in the decimal system) is recorded by painting out the first and fourth bit indicating fields, for example.

However, when quite a lot of various data are recorded, such a code mark type of method still has several disadvantages such as arrangement of a plurality of code marks, lack of the concealment of data, or insufficient prevention against forgeries although the record of data has come to be easily carried out than before.

To overcome those problems, the present invention aims to provide a method for recording data for recording a lot of data in a code mark; a data recording medium wherein recorded data are hard to fade out, they are tightly concealed, and forgery is not easily committed; and a method for reading data, as well as a method for dissolving the difficulty in record of data.

SUMMARY OF THE INVENTION

To achieve the object, a method for recording data of the invention comprises the steps of:
forming a code mark with N (=1, 2, 3, ...) bit indicating fields on the surface of a piece of material wherein a binary number of N bits is recorded;
displaying given bit indicating fields thereof in the same color to designate one numeric value; and
superimposing M (=1, 2, 3, ...) kinds of colors upon any of the fields.

According to the method, M kinds of numeric data can be recorded in a unit consisting of N bit indicating fields.

Further, a printed body printed by the method of the invention comprises N bit indicating fields of which a unit designates a binary number of N bits on the surface of a piece of material, M kinds of colors being superimposed upon any of the fields, given fields thereof being displayed in the same color to designate one numeric value.

According to the printed body, M kinds of data can be read out from a unit of N bits indicating fields.

Further, a data recording medium of the invention comprises a plurality of bit indicating fields, a unit of the fields designating a binary number on the surface of a piece of material, any of the fields being painted out with the same dot pattern in pitch to designate one numeric value of the binary number, any of the fields being mixedly painted out with different dot patterns in pitch from the others to designate the binary number.

According to the data recording medium, a lot of numeric data can be recorded by using some kinds of pitches since data are recorded as a dot pattern of a given pitch.

Further, a data recording medium of the invention comprises:
an opaque sheet on which there are drawn fine parallel lines, latticed lines, or dot patterns for print same or different in pitch from a transparent reference sheet on which there are drawn fine parallel lines, latticed lines, or dot patterns for print with a given pitch,
the opaque sheet being illuminated via the transparent reference sheet to produce moire fringes relative to recorded data.

Further, a method for reading data from a data recording medium of the present invention comprises the steps of:
superimposing a transparent reference sheet whereon there are drawn fine parallel lines, latticed lines, or dot patterns for print with a given pitch upon a data recording medium whereon there are drawn fine parallel lines, latticed lines, or dot patterns for print same or different in pitch from the transparent reference sheet so as to form a given angle for producing moire fringes; and
reading out the data of the data recording medium by detecting widths and/or pitches and/or angles of the moire fringes.

Further, a data recording medium of the invention comprises:
a transparent sheet on which there are drawn fine parallel lines, latticed lines, or dot patterns for print same or different in pitch from an opaque reference sheet on which there are drawn fine parallel lines, latticed lines, or dot patterns for print with a given pitch,
the transparent sheet being illuminated via the opaque reference sheet to produce moire fringes relative to recorded data.

Further, a reading method from a data recording medium of the invention comprises the steps of:
superimposing an opaque reference sheet whereon there are drawn fine parallel lines with a given pitch upon a transparent data recording medium whereon there are drawn fine parallel lines, latticed lines, or dot patterns for print same or different in pitch from the opaque reference sheet so that both the lines of the reference sheet and the data recording medium form a given angle to produce moire fringes; and reading out the recorded data of the data recording medium by detecting widths and/or pitches and/or angles of the moire fringes.

Further, a data recording medium of the invention comprises:

a transparent sheet whereon there are drawn fine parallel lines, latticed lines, or dot patterns for print same or different in pitch from a transparent reference sheet whereon there are drawn fine parallel lines, latticed lines, or dot patterns for print with a given pitch, the transparent sheet being illuminated via the transparent reference sheet to produce moire fringes relative to recorded data.

Further, a method for reading data from a data recording medium of the invention comprises the steps of:

superimposing a transparent reference sheet whereon there are drawn fine parallel lines with a given pitch upon a transparent data recording medium whereon there are drawn fine parallel lines, latticed lines, or dot patterns for print same or different in pitch from the opaque reference sheet so that the lines of the reference sheet and the data recording medium form a given angle to produce moire fringes; and reading out the recorded data of the data recording medium by detecting widths and/or pitches and/or angles of the moire fringes.

According to the data recording medium and the method for reading data therefrom, the pitches of moire fringes to be produced make it possible to detect any combination of the superimposed dot patterns and accordingly read out the recorded data on the basis of the dot patterns.

DETAILED DESCRIPTION OF THE EMBODIMENTS

The invention will be described in greater detail hereinafter relative to non-limitative embodiments and the attached drawings.

Figure 1:
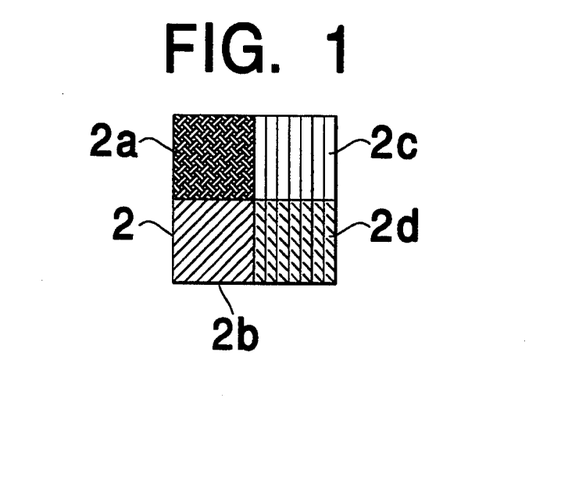
FIG. 1 shows a code mark according to an embodiment of the present invention.
Figure 6:
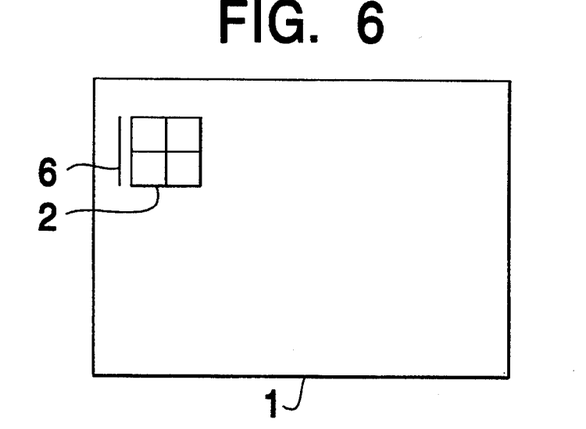
FIG. 6 shows a card provided with a code mark according to an embodiment of the present invention.

FIG. 6 shows a card 1 where data are recorded by a method for recording data according to a first embodiment of the invention. The card 1 is provided with a code mark 2. As shown in FIG. 1, the code mark 2 includes a first bit indicating field 2a designating the first bit of a binary number, a second bit indicating field 2b designating the second bit thereof, a third bit indicating field 2c designating the third bit thereof, and a fourth bit indicating field 2d designating the fourth bit thereof.

The first bit indicating field 2a represents "1" or "0" in the decimal system. That is, by painting out or marking the field 2a, for example, the code mark 2 records "1" in the decimal system and without painting out the field 2a, it records "0" in the decimal system.

The second bit indicating field 2b represents "2" in the decimal system. That is, by painting out the field 2b, for example, the code mark 2 records "2" in the decimal system and without painting out the field 2b, it records "0" in the decimal system.

The third bit indicating field 2c represents "4" in the decimal system. That is, by painting out the field 2c, for example, the code mark 2 records "4" in the decimal system and without painting out the field 2c, it records "0" in the decimal system.

The fourth bit indicating field 2d represents "8" in the decimal system. That is, by painting out the field 2d, for example, the code mark 2 records "8" in the decimal system and without painting out the field 2d, it records "0" in the decimal system.

Therefore, when all of the bit indicating fields 2a through 2d are marked as shown in FIG. 1, the code mark 2 represents "15" in the decimal system as the sum total of "1" of the first bit indicating field 2a, "2" of the second bit indicating field 2b, "4" of the third bit indicating field 2c, and "8" of the fourth bit indicating field 2d. When none of the bit indicating fields 2a through 2d is marked, the code mark 2 represents "0" in the decimal system. Thus, the code mark 2 can represent 16 kinds of numeric data, i.e., "0" through "15" by variously marking the bit indicating fields 2a through 2d.

In this embodiment, as shown in FIGS. 1 through 4, the code mark 2 comprises a yellow code mark 3, a blue code mark 4, and a red code mark 5. The halftone dots of the three primary colors are superimposed upon the bit indicating fields 2a through 2d. Green, brown, or purple, for example, produced by superimposing the primary colors upon each other is displayed on any of the bit indicating fields 2a through 2d, so that it is possible to easily distinguish any combination of the primary colors painted out each field with the naked eye.

Figure 2:
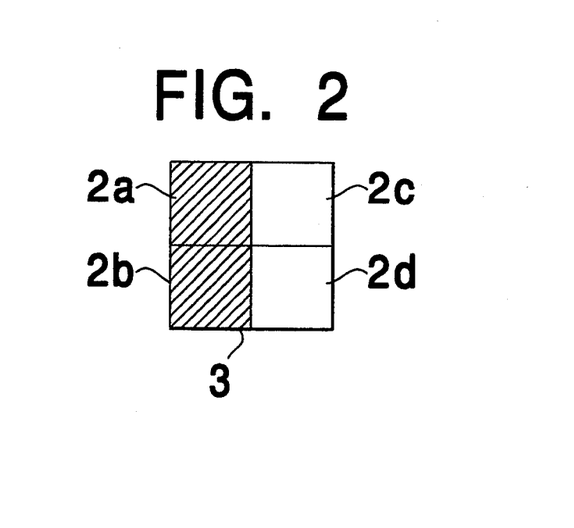
FIG. 2 shows a code mark consisting of yellow halftone dots.
Figure 3:
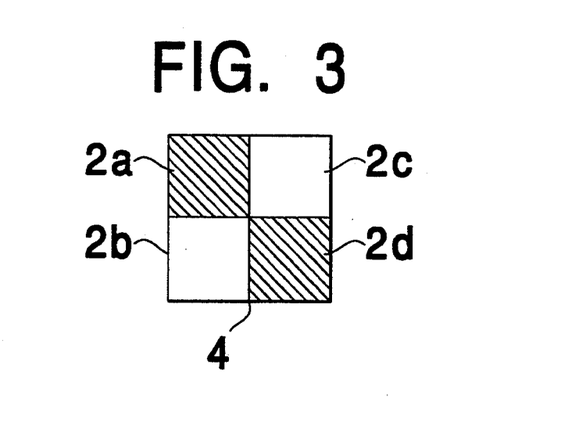
FIG. 3 shows a code mark consisting of blue halftone dots.
Figure 4:
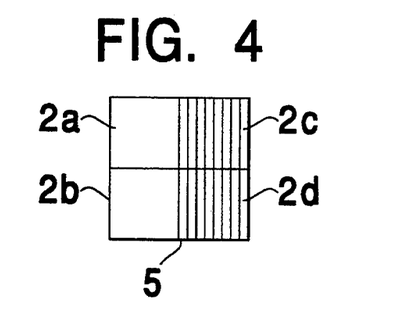
FIG. 4 shows a code mark consisting of red halftone dots.

For example, the code mark 3 with yellow dots as shown in FIG. 2 represents "0011" in the binary system (equivalent to "3" in the decimal system), the code mark 4 with blue dots as shown in FIG. 3 represents "1001" in the binary system (equivalent to "9" in the decimal system), and the code mark 5 with red dots as shown in FIG. 4 represents "1100" in the binary system (equivalent to "12" in the decimal system). The code mark 2 where yellow, blue, and red dots are superimposed upon each other as shown above includes three kinds of numeric data, i.e., "0011" "1001" "1100". Therefore, in case of multiplying the three numeric data together, the number "100100110" in the binary system (equivalent to "294" in the decimal system) is recorded. Since the code marks 3, 4, and 5 represent 16 kinds of numeric data respectively, the code mark 2 can represent 4096 (=16×16×16) kinds of data and thereby a great deal of data are recorded. To record data, the code marks 3, 4, and 5 may be used independently of each other, of course.

Therefore, to represent lot numbers of merchandise, for example, 4096×4096×4096 (approximately 68.7 billion) kinds of data are recorded by providing a card with three code marks each consisting of the three primary colors.

Alternatively, in two kinds of primary colors including black and white, halftone dots may be arranged in various ratios to record a large quantity of numeric data.

Figure 5:
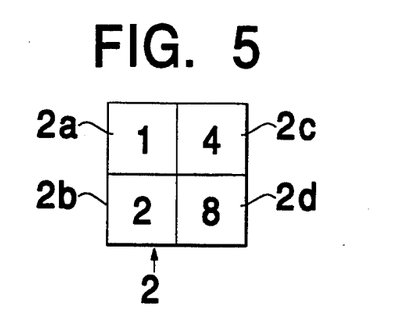
FIG. 5 shows the first to fourth bit indicating fields of the code mark of FIG. 1.

Also, it is possible to read out numeric data from such code marks with the naked eye by printing the numbers "1", "2", "4", and "8", as shown in FIG. 5, on the first through fourth bit indicating fields respectively for reading them out in the accurate order.

Alternatively, numeric data may be read out such that the code mark 2 is scanned with an area type of CCD (charge-coupled device) camera, as shown in FIG. 6, from a reference mark 6 printed at the side of the first and second bit indicating fields 2a and 2b, and signals detected by the CCD camera are processed with a microcomputer wherein the pattern of the code mark 2 is previously memorized to read out the data. In this case, filters with the three primary colors are disposed in each objective lens optical system of the first through third CCD cameras and the colors yellow, blue, red and so on of the code mark 2 are transmitted through the filters or shaded thereby.

For example, fields painted out in the color yellow is scanned with the first CCD camera, fields painted out in the color blue are scanned with the second CCD camera, fields painted out in the color red are scanned with the third CCD camera, the numeric data recorded in the code mark 2 are optically read out based on the values detected by the first through third CCD cameras, and the values are inputted into a microcomputer to transfer the values into the numeric data.

Therefore, by arranging the compounding ratio of the halftone dots variously, a great deal of data are allowed to be recorded in a code mark 2 and also the data can be accurately read out with the CCD camera.

There will be now described each embodiment of a data recording medium and a method for recording data of the present invention with reference to the attached drawings.

Figure 7A:
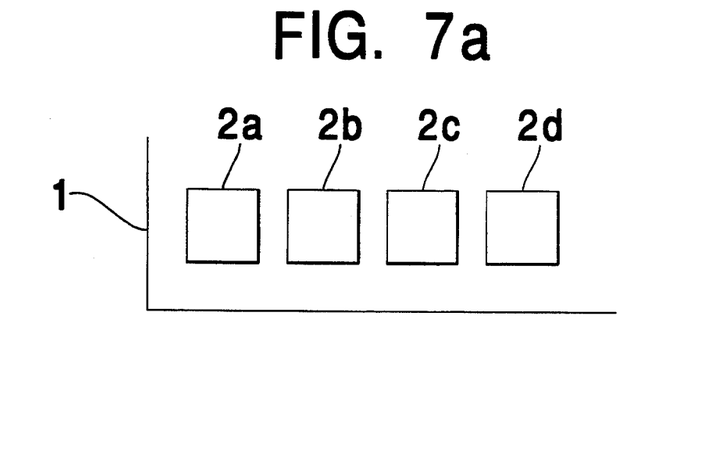
FIGS. 7(a), 7(b) and 7(c) show cards provided with various sorts of code marks according to an embodiment of the present invention.
Figure 7B:
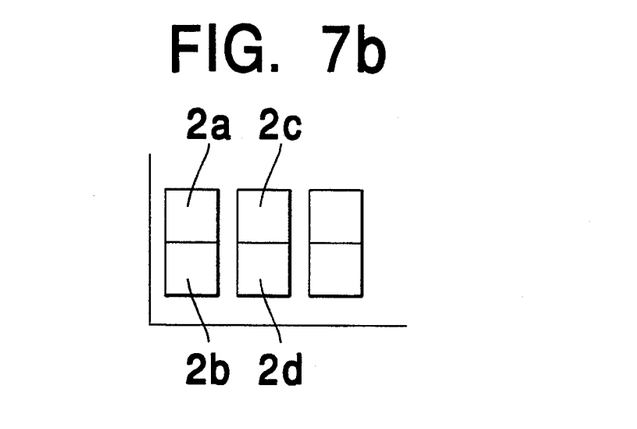
Figure 7C:
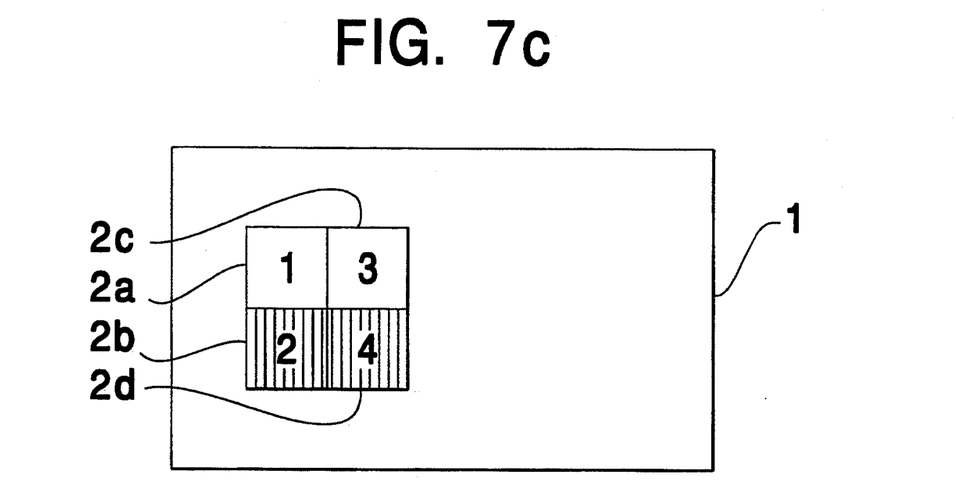
Figure 8A:
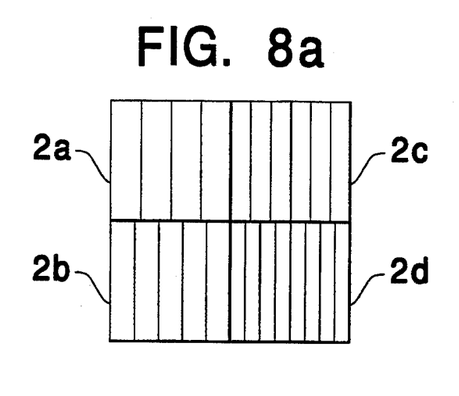
FIGS. 8(a)-8(f) are a plan view of code marks according to an embodiment of the present invention.
Figure 8B:
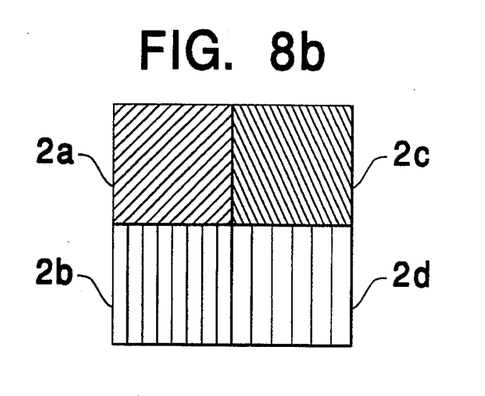
Figure 8C:
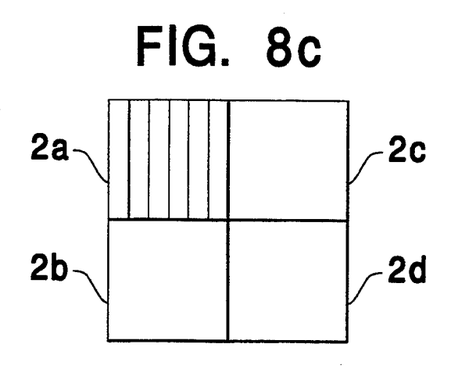
Figure 8D:
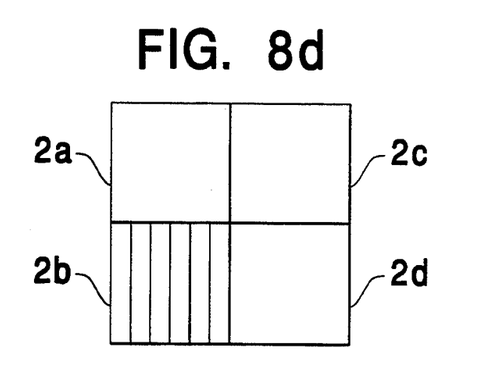
Figure 8E:
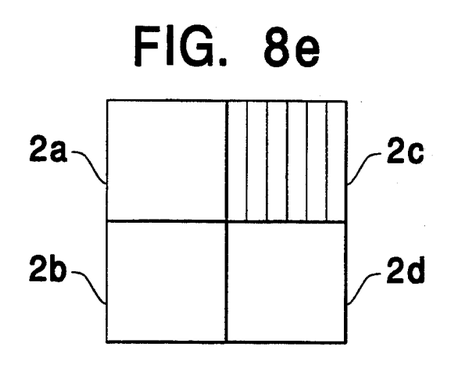
Figure 8F:
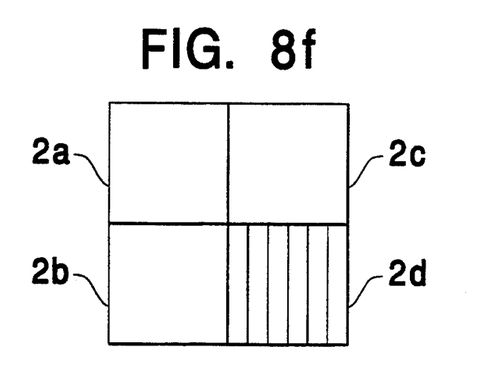

FIG. 7 shows a card as a data recording medium of the invention. The surface of the card 1 in FIG. 7(a) is provided with rectangles or squares 2a through 2d each size of which is equal to the other and which are disposed at regular intervals of space. The surface of the card 1 in FIG. 7(b) is provided with several rectangles or squares of which a pair of contiguous rectangles or squares composes a unit mark. A code mark comprises these unit marks. The surface of the card 1 in FIG. 7(c) is provided with a code mark 2 having four squares 2a through 2d with no space therebetween. Each square may be sectioned by a deep-colored line with a width different from that of fine parallel lines used in the squares 2b and 2d. Each square need not necessarily be sectioned by any line, of course.

To record numeric data in FIG. 7(a) or 7(b), many striped fine parallel lines are given to any of squares 2a through 2d.

For example, the square 2a represents the first bit in the binary system by giving the parallel lines there, the square 2b represents the second bit in the binary system by giving the parallel lines there, the square 2c represents the third bit in the binary system by giving the parallel lines there, and the square 2d represents the fourth bit in the binary system by giving the parallel lines there.

As another example, by giving the parallel lines to each square, the square 2a represents "1" and "0" in the decimal system, the square 2b represents "2" and "0" in the decimal system, the square 2c represents "4" and "0" in the decimal system, and the square 2d represents "8" and "0" in the decimal system.

In other words, by giving the parallel lines to any of squares 2a through 2d, numeric data from "0" to "15" can be represented according to the code mark 2. The parallel lines in the squares 2a through 2d may be given uniformly or differently in angle and pitch from each other.

Referring to FIG. 8, four blocks of squares 2a through 2d are each formed as a marking area. FIG. 8(a) shows a code mark 2 consisting of squares 2a through 2d parallel lines of each of which are drawn in the same direction and in a different pitch from the other, FIG. 8(b) shows a code mark 2 consisting of squares 2a through 2d parallel lines of each of which are drawn in a different pitch and a different angle from the other, and FIGS. 8(c) through 8(f) each show a code mark consisting of squares of which only one square has parallel lines. The parallel lines of FIGS. 8(c) through 8(f) are similar in pitch and direction to each other and are arranged in a different block from each other.

Figure 9:
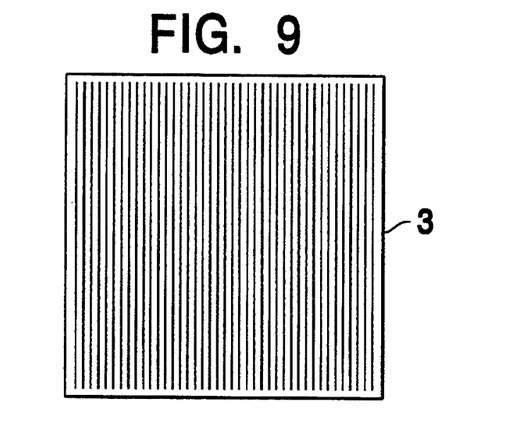
FIG. 9 is a plan view of a projection screen according to an embodiment of the invention.

FIG. 9 shows a reference sheet 3 comprising a base made of a transparent film or plate. Regularly pitched parallel lines are drawn on the base. The lines may be drawn in any transparent or opaque colors in place of opaque black. The pitch of the parallel lines in squares 2a through 2d may be either regular or irregular, For example, when the reference sheet 3 is superimposed upon the code mark of FIG. 8(a) and is illuminated with light, the squares 2a through 2d each produce about two to seven moire fringes (abbreviated to m) independently of the other square. When the reference sheet 3 is superimposed upon the code mark of FIG. 8(b) and is illuminated with light, the squares 2a through 2d each produce moire fringes (m) different in pitch and angle from the other square. When the reference sheet 3 is superimposed upon each code mark of FIGS. 8(c) through 8(f) and is illuminated with light, one of the squares 2a through 2d, which is 2(a) of FIG. 8(c), 2(b) of FIG. 8(d), 2(c) of FIG. 8(e), or 2(d) of FIG. 8(f), produces vertical moire fringes (m) with a regular pitch. The number L of moire fringes produced by superimposing the reference sheet 3 upon the code mark 2 is represented as follows:

$$L = |M - N|$$

where M is the number of parallel lines drawn on the code mark 2 and N is the number of parallel lines drawn on the reference sheet 3.

Figure 11:
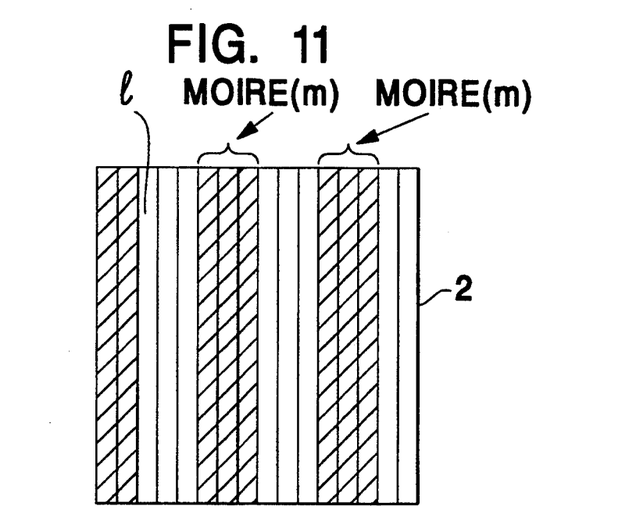
FIG. 11 is a plan view showing an example of moire fringes produced by superimposing a code mark upon a reference sheet.

FIG. 11 is a plan view showing moire fringes (m) produced at the time when the parallel lines of the reference sheet 3 are parallelly superimposed upon those of the code mark 2. The moire fringes (m) are received by photoelectric transfer means. By making the width of a light transmitting portion between the parallel lines equal or wider than that of the lines or a light shading portion (black portion, light absorbing portion, or colored portion), such as in the ratio of 1:1 or 1.5:1, clear discrimination is easily carried out.

The parallel lines may be colored in such a color tone as black, red, blue, Fellow, or green according to a printing, photographing, or dyeing method. To discriminate moire fringes more clearly, it is preferable to conform the color of the lines of a code mark to that of a reference sheet.

Figure 10:
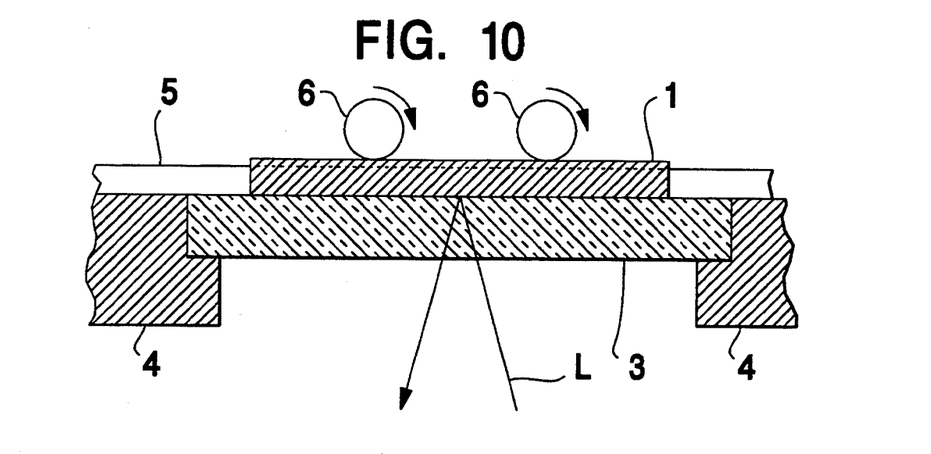
FIG. 10 is a partially sectional view of a device to read out data of the card of FIG. 7 using the projection screen.

To read out data recorded in a card 1 arranged as above, the reference sheet 3 is loaded in a reader as shown in FIG. 10. Referring to FIG. 10, the reference sheet 3 is supported in supporting frames 4 and 4 which are provided with a guide 5 for guiding a card 1 linearly. The reference sheet 3 is made of a transparent glass plate and has a same or different pitch from that of the parallel lines of a code mark 2. The code mark 2 of the card 1 is superimposed upon the reference sheet or screen 3. If the same pitch is employed in the parallel lines of both the screen 3 and the mark 2, the guide 5 or the screen 3 is set so that the lines of the screen 3 intersect those of the code mark 2 in order to produce moire. Preferably, the angle between the parallel lines and a guiding direction of the guide 5 is freely selected when the reference sheet or screen 3 is fixed to the supporting frame 4.

The card 1 is guided by the guide 5 and is moved by a pinch roller 6 to be slided along the surface of the reference sheet 3. A light source and photoelectric transfer means (not shown) are disposed under the screen 3. Light emitted from the light source is projected onto the screen 3 and then moire fringes (m) produced on the screen 3 are received by the photoelectric transfer means. For photoelectric transfer means, a linear type of CCD is employed whereby detection signals of light reflected from the screen 3 of the moire fringes (m) are obtained. The detection signals obtained by the CCD are inputted into a comparator (not shown). The comparator is in advance made to input reference data for detecting the number and angle of moire fringes and memorize a memory table of numeric data corresponding to the reference data. The output of the CCD is compared to the reference data.

The comparison is carried out in the following way.

Figure 12A:
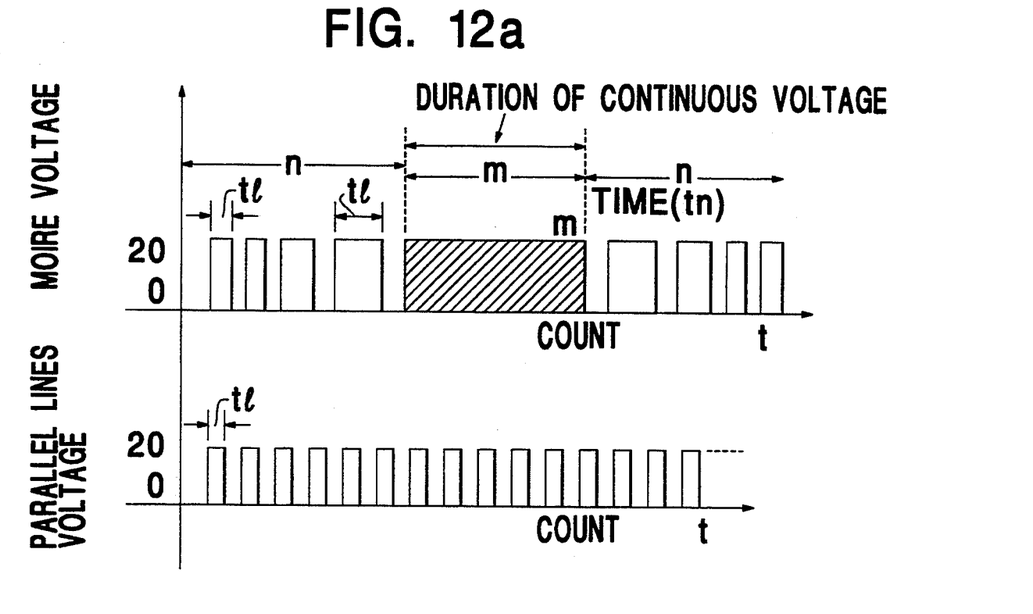
FIGS. 12(a) and 12(b) are graphical representations of detected values of moire fringes.

As shown in FIG. 12(a), when the CCD detects moire fringes (m), the CCD outputs output signals of a voltage beyond a given voltage. Afterthere, a clock pulse counter of the comparator measures the length of time of the signals. This measured length is defined as moire detection value (tm).

Next, the parallel lines (l) in a portion (n) without any moire fringe are also detected with the CCD. Since the output voltage of the CCD is lower than the given voltage when detecting the parallel lines (1) with the CCD, the length of time of the output signals of the CCD is measured with the clock pulse. counterThis measured value of the parallel lines (l) without any moire fringe is defined as parallel lines detection value (tl). A low-frequency pulse counter may be used for a high-frequency area in place of the clock pulse counter.

A moire detection value per a moire fringe is tm, a parallel lines detection value in a portion without any moire fringe is tn, and a detection value of a width (m+n) consisting of a moire fringe and a portion without moire is tm+tn. Therefore, the detection value is $2\times(tm+tn)$ in the case of two couples of a moire fringe and a portion without moire, $3\times(tm+tn)$ in the case of three couples of a moire fringe and a portion without moire, and $P\times(tm+tn)$ in the case of P couples of a moire fringe and a portion without moire.

Reference data tlo, tmo, tno, and tmo+tno corresponding to the detection values tl, tm, tn, and tm+tn respectively, or other reference data which are obtained by adding allowable values $\pm\Delta t$ to each of tl, tm, tn, and tm+tn are previously memorized in the comparator.

Figure 12B:
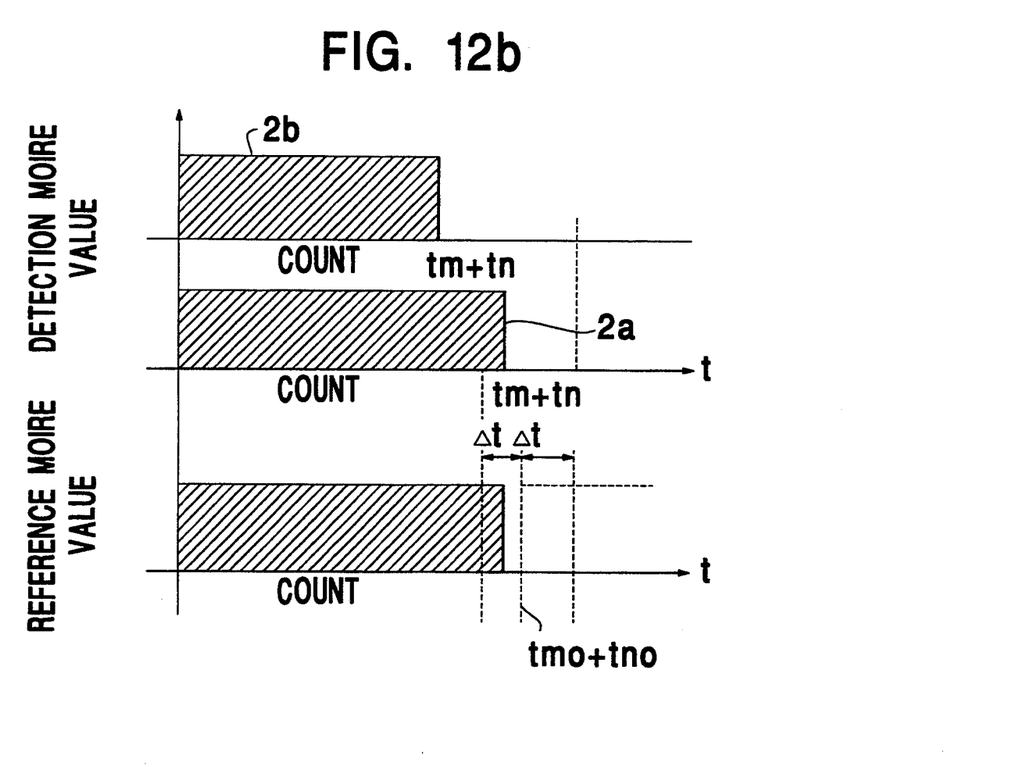

As shown in FIG. 12(b), when the values tm, tn, and tm+tn are within the predetermined reference data, the identification numeric data of a code mark 2 corresponding to the detection values are read out on the basis of a memory table of numeric data corresponding to the reference data.

FIG. 10 shows that the card 1 is closely superimposed upon the screen 3. An image of the code mark 2 of the card i may be formed on the line-drawn surface of the screen 3 disposed at the middle of a lens optical system and the image may be received by the photoelectric transfer means by properly using the lens optical system in place of the CCD. Also, the code mark 2 and the parallel lines of the screen 3 may be allowed to be received by the photoelectric transfer means through each individual optical system.

In the above comparison method, a code mark formed with various kinds of parallel lines is discriminated by classifying the reference data (the count value t0 or t0$\pm\Delta t$) for discriminating the code mark into several steps (K steps). A blank space between code marks each as a unit is distinguished from the parallel lines of the code marks by detecting the blank space with the CCD whereby a high voltage area of detection signals of the blank area is detected longer than that of moire fringes. In the case of a code mark consisting of rectangles contiguous to each other, the size of each rectangle is obtained by dividing with the number of the rectangles contiguous in the pulse count scanning direction.

As a data recording medium and a reference sheet of the present invention, grate-like nets or halftone dots used for print may be employed in place of parallel lines.

Parallel lines composing a code mark 2 may be displayed by any combination of the three primary colors so that a plural number of data can be recorded on condition that the same color designates the same numeric value.

As a data recording medium, paper tickets, printings, resins, or labels may be employed in place of cards.

What is claimed is:

1. A data recording medium comprising:
   at least four square bit-indicating fields which form a square or rectangular unit that designates a binary number with N bits on the surface of a piece of material, M kinds of colors being superimposed upon the fields such that fields printed with dots of a first color designate one numeric value and fields printed with dots of a second color designate another numeric value, said at least four square bit-indicating fields producing moire fringes used to distinguish said binary number.

2. A data recording medium as claimed in claim 1, further comprising:

fields formed with a dot pattern having a pitch to designate one numeric value of the binary number, said fields being formed with dot patterns different in pitch to designate the binary number.

3. A data recording medium as claimed in claim 1, wherein said square or rectangular unit is a code mark, said code mark further comprising:

a first bit-indicating field for denoting a first bit of a binary number, a second bit-indicating field for denoting a second bit of said binary number, a third bit-indicating field for denoting a third bit of said binary number, and a fourth bit-indicating field for denoting a fourth bit of said binary number on the surface of said piece of material, said first to fourth bit-indicating fields being marked to designate binary data, said M kinds of colors being in layers so that a monochromatic color designates one numeric value and each color used as a component of said binary number is distinctive in appearance from other colors when printed.

4. A data recording medium as claimed in claim 1, further comprising:

an opaque sheet on which are drawn fine parallel lines, latticed lines, or dot patterns having pitches printed within said at least four square bit-indicating fields with respect to a transparent reference sheet on which are drawn fine parallel lines, latticed lines, or dot patterns, said opaque sheet being illuminated via said transparent reference sheet to produce said moire fringes representing recorded data.

5. A data recording medium as claimed in claim 1, further comprising:

a transparent sheet on which are drawn fine parallel lines, latticed lines, or dot patterns having pitches printed within said at least four square bit-indicating fields with respect to an opaque reference sheet on which are drawn fine parallel lines, latticed lines, or dot patterns, said transparent sheet being illuminated via said opaque reference sheet to produce said moire fringes representing recorded data.

6. A data recording medium as claimed in claim 1, further comprising:

a transparent sheet on which are drawn fine parallel lines, latticed lines, or dot patterns having pitches drawn within said at least four square bit-indicating fields with respect to a transparent reference sheet on which are drawn fine parallel lines, latticed lines, or dot patterns, said transparent sheet being illuminated via said transparent reference sheet to produce said moire fringes representing recorded data.

7. A data recording medium comprising:

a surface having several rectangular or squares formed thereon, at least four of said several rectangles or squares being grouped to form a unit mark, with a first of said at least four rectangles or squares representing a first bit of a recorded binary value and with a second of said at least four rectangles or squares representing a second bit of said recorded binary value;

a first marking, which corresponds to a first binary number, formed as printed dots of a first color which produce a first number of moire fringes in at least one of said at least four rectangles or squares; and a second marking, which corresponds to a second binary number, formed as printed dots of a second color which produce a second number of moire fringes in at least one of said at least four rectangles or squares, and superimposed on said first marking such that said unit mark designates at least two different binary values.

8. A data recording medium according to claim 7, wherein said first marking, in combination with a reference sheet, produces said first number of moire fringes and wherein said second marking, in combination with said reference sheet, produces said second number of moire fringes.

9. A data recording medium according to claim 7, wherein said first number of moire fringes is produced by varying the width, pitch or angle with which said dots of said first color are printed.

* * * * *